United States Patent
Liu et al.

(10) Patent No.: US 12,288,176 B2
(45) Date of Patent: Apr. 29, 2025

(54) CLOUD-EDGE COLLABORATION FORECASTING SYSTEM AND METHOD FOR ALUMINUM OXIDE PRODUCTION INDEXES

(71) Applicant: Northeastern University, Shenyang (CN)

(72) Inventors: Changxin Liu, Shenyang (CN); Ning Yuan, Shenyang (CN); Jinliang Ding, Shenyang (CN); Tianyou Chai, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 767 days.

(21) Appl. No.: 17/597,189

(22) PCT Filed: Jul. 18, 2019

(86) PCT No.: PCT/CN2019/096512
§ 371 (c)(1),
(2) Date: Dec. 28, 2021

(87) PCT Pub. No.: WO2021/007845
PCT Pub. Date: Jan. 21, 2021

(65) Prior Publication Data
US 2022/0309393 A1    Sep. 29, 2022

(30) Foreign Application Priority Data
Jul. 16, 2019  (CN) .......................... 201910640654.3

(51) Int. Cl.
G06Q 10/0639    (2023.01)
C01F 7/02    (2022.01)
(Continued)

(52) U.S. Cl.
CPC ..... G06Q 10/06393 (2013.01); G06F 18/214 (2023.01); G06Q 10/04 (2013.01);
(Continued)

(58) Field of Classification Search
None
See application file for complete search history.

(56) References Cited

U.S. PATENT DOCUMENTS 5,884,685 A * 3/1999 Umezawa .............. B22D 11/16
164/451
8,965,625 B2   2/2015 Dvorak et al.
(Continued)

FOREIGN PATENT DOCUMENTS

CN    101187803 A    5/2008
CN    103955760 A    7/2014
(Continued)

*Primary Examiner* — Ryan Barrett
(74) *Attorney, Agent, or Firm* — MUNCY, GEISSLER, OLDS & LOWE, P.C.

(57) ABSTRACT

Provided is a cloud-edge collaboration forecasting system and method for aluminum oxide production indexes. The forecasting system performs forecasting algorithm selection, parameter configuration and model training on indexes and variables of the aluminum oxide production process at a cloud model training server, performs evaluation and parameter correction on the trained model to obtain an optimal training model, and pre-processes the data in the aluminum oxide production process at an aluminum oxide production index forecasting computer at an edge end. The trained model parameters are imported from the cloud, and further the trained forecasting model is used for forecasting aluminum oxide production indexes for different production processes. The forecasting system and method can provide powerful calculating resources by training an aluminum oxide production index forecasting model through the cloud (Continued)

model training server, and real-time convenient aluminum oxide production index forecasting through the computer at the edge end.

6 Claims, 2 Drawing Sheets

(51) Int. Cl.
    *G06F 18/214*     (2023.01)
    *G06Q 10/04*     (2023.01)
    *G06Q 10/067*     (2023.01)
    *G06Q 50/04*     (2012.01)

(52) U.S. Cl.
    CPC ........... *G06Q 10/067* (2013.01); *G06Q 50/04* (2013.01); *C01F 7/02* (2013.01); *Y02P 90/30* (2015.11)

(56) References Cited

U.S. PATENT DOCUMENTS

| | | | |
|---|---|---|---|
| 12,001,178 B2 * | 6/2024 | Ding | G05B 13/042 |
| 2012/0191235 A1 * | 7/2012 | Shin | G06Q 10/04 |
| | | | 700/104 |
| 2012/0197542 A1 * | 8/2012 | Tessier | C25C 3/20 |
| | | | 702/23 |
| 2018/0081339 A1 * | 3/2018 | Zhu | G05B 19/406 |
| 2020/0166909 A1 * | 5/2020 | Noone | G06N 20/00 |
| 2021/0096544 A1 * | 4/2021 | Ding | C25D 5/44 |
| 2021/0192272 A1 * | 6/2021 | Liu | G06N 3/048 |
| 2022/0245538 A1 * | 8/2022 | Davis | G06Q 10/067 |
| 2023/0044522 A1 * | 2/2023 | Lu | G05B 23/0294 |
| 2023/0325689 A1 * | 10/2023 | Chai | G06N 5/022 |
| | | | 706/25 |
| 2023/0408985 A1 * | 12/2023 | Nordh | G05B 17/02 |
| 2024/0004355 A1 * | 1/2024 | Zhao | G05B 13/048 |

FOREIGN PATENT DOCUMENTS

| | | |
|---|---|---|
| CN | 104076686 A | 10/2014 |
| CN | 104570739 A | 4/2015 |
| CN | 108092319 A | 5/2018 |
| CN | 109032094 A | 12/2018 |

\* cited by examiner

CLOUD-EDGE COLLABORATION FORECASTING SYSTEM AND METHOD FOR ALUMINUM OXIDE PRODUCTION INDEXES

BACKGROUND OF THE INVENTION

1. Field of the Invention

The invention relates to the technical field of industrial cloud computing and edge end collaboration forecasting, in particular to a cloud-edge collaboration forecasting system and method for aluminum oxide production indexes.

2. The Prior Arts

Because aluminum oxide production is complex in whole flow technology and involves various working procedures and a large amount of production data. Due to safety and other reasons, enterprises do not allow staff to randomly acquire, modify, verify and test data such as variables and indexes at the industrial site, requirements for improving product quality and reducing energy consumption are relatively difficult. In addition, the existing aluminum oxide production index forecasting process mainly includes the steps of separately processing industrial process data acquired by sensors, and the like and laboratory assay analysis data, artificially re-processing the processed results to ensure the consistency of data dimensions and the like, and performing model training by using the data, but it is difficult for this process to meet the real-time requirements of the forecasting process, so that it is impossible to provide real-time feedback for the staff, and the staff cannot make real-time adjustments on product variables, and the like. Therefore, it is very necessary to establish an efficient and convenient forecasting system so as to better forecast the production indexes of the aluminum oxide production process.

SUMMARY OF THE INVENTION

A technical problem to be solved by the invention is to provide a cloud-edge collaboration forecasting system and method for aluminum oxide production indexes aiming at deficiency in the prior art to forecast production indexes in the aluminum oxide production process.

In order to solve the technical problem, the technical scheme adopted by the invention is: in one aspect, the cloud-edge collaboration forecasting system for aluminum oxide production indexes provided by the invention comprises a data acquisition device, a hardware platform and a software system arranged on the hardware platform, wherein the data acquisition device is used for acquiring whole-flow actual aluminum oxide production index data in an aluminum oxide production process and transmitting the acquired whole-flow actual aluminum oxide production index data in a fixed time interval to a cloud model training server and an aluminum oxide production index forecasting computer at an edge end; the hardware platform comprises the cloud model training server and the aluminum oxide production index forecasting computer at the edge end; the software system comprises software arranged in the cloud model training server and software arranged in the aluminum oxide production index forecasting computer at the edge end; and the software arranged in the cloud model training server realizes selective management of an aluminum oxide production index forecasting algorithm, trains and evaluates an aluminum oxide production index forecasting model through the whole-flow actual aluminum oxide production index data in the aluminum oxide production process, applies the acquired whole-flow actual aluminum oxide production index data to the aluminum oxide production index forecasting model, performs big data analysis on a model forecasting result and the whole-flow actual aluminum oxide production index data, and further corrects forecasting model parameters; and the software arranged in the aluminum oxide production index forecasting computer at the edge end imports the forecasting model parameters after being corrected by the cloud model training server from the cloud model training server, or directly and remotely updates the corrected forecasting model parameters, further transmits the whole-flow actual aluminum oxide production index data in the aluminum oxide production process, acquired by the data acquisition device, into the edge end, and forecasts the aluminum oxide production indexes for different production processes through the trained aluminum oxide production index forecasting model at the edge end.

Preferably, the software arranged in the cloud model training server comprises a forecasting model training scheme management unit, an algorithm and model library management unit, a big data analysis unit, a model training unit, a forecasting model parameter correction unit, a forecasting model analysis unit and a model correction parameter download unit;

The forecasting model training scheme management unit is used for managing training sample data and storage model parameters used during a period of training the aluminum oxide production index forecasting model, so as to perform comparison when analyzing properties of the aluminum oxide production index forecasting model;

The algorithm and model library management unit is used for managing the obtained aluminum oxide production index forecasting model, the aluminum oxide production index forecasting algorithm adopted in a model training process, and commonly-used data processing algorithms built in the software system, and provides creating, updating and deleting functions of the aluminum oxide production index forecasting algorithm;

The model training unit is used for performing model training according to the whole-flow actual aluminum oxide production index data generated during aluminum oxide actual operation, acquired by the data acquisition device within a certain time, and a selected forecasting algorithm, and transmitting a model training result to a model training and evaluating unit; the model training process comprises four steps of data selection, data partitioning, data preprocessing and algorithm selection;

The big data analysis unit calculates correlation coefficients between an aluminum oxide production index forecasting result and an actual value through the trained aluminum oxide production index forecasting model according to acquired aluminum oxide production and operation data, and determines whether model parameter correction needs to be performed according to the correlation coefficients;

The forecasting model parameter correction unit is configured to perform training the aluminum oxide production index forecasting model on the basis of model training parameters according to latest production working condition data so as to obtain the corrected forecasting model parameters adapting to new working conditions;

The forecasting model analysis unit forecasts and analyzes the whole-flow actual aluminum oxide production index data stored in a forecasting model training scheme management unit through the corrected forecasting model parameters and current forecasting model parameters; if an aluminum oxide production index result forecasted with the corrected forecasting model parameters is better in accuracy than that with the current forecasting model parameters, the corrected forecasting model parameters are selected, or else the current forecasting model parameters are maintained not to be changed; and The model correction parameter download unit provides an output function of the corrected forecasting model parameters, so that the corrected forecasting model parameters are downloaded in a forecasting model management unit of the aluminum oxide production index forecasting computer at the edge end, and further provides an on-line download interface of the corrected forecasting model parameters which can be automatically and remotely updated by the software in the aluminum oxide production index forecasting computer at the edge end.

Preferably, the cloud model training server further comprises the model training and evaluating unit used for performing property evaluation on the trained aluminum oxide production index forecasting model, wherein as for the property evaluation, comparison analysis is performed through indexes of mean square errors, average absolute value errors, average absolute percentage errors and forecasting value and actual value correlation coefficients.

Preferably, the model training unit is further internally provided with a parameter configuration unit used for performing parameter configuration of the aluminum oxide production index forecasting algorithm on a specific training algorithm adopted in the model training process.

Preferably, the software arranged in the aluminum oxide production index forecasting computer at the edge end comprises the forecasting model management unit and an intelligent forecasting unit;

The forecasting model management unit manages a training scheme of a local edge end model, and comprises a model selection module and a model parameter correction module, wherein the model selection module selects the aluminum oxide production index forecasting model of a corresponding production process for forecasting according to a determination result of the aluminum oxide production process, and the edge end and a cloud both have the same various aluminum oxide production index forecasting model training schemes; the model parameter correction module imports the forecasting model parameters corrected by the cloud model training server, or directly and remotely updates the corrected forecasting model parameters so as to still guarantee an accuracy of the model forecasting result under the new working conditions; and The intelligent forecasting unit forecasts aluminum oxide production indexes for different production processes with the whole-flow actual aluminum oxide production index data, transmitted to the edge end by the trained aluminum oxide production index forecasting model at the edge end.

In one aspect, the invention further provides the cloud-edge collaboration forecasting method for aluminum oxide production indexes. The cloud-edge collaboration forecasting method comprises three parts of acquiring the whole-flow actual aluminum oxide production index data, operating the cloud model training server and operating the aluminum oxide production index forecasting computer at the edge end, wherein The acquiring the whole-flow actual aluminum oxide production index data means acquiring actual operation data generated in the aluminum oxide production process by the data acquisition device, and transmitting the acquired actual operation data to the model training unit of the cloud model training server and the intelligent forecasting unit of the aluminum oxide production index forecasting computer at the edge end;

The operating the cloud model training server comprises the model training process and a model parameter correction process, wherein The model training process comprises the following steps:

Step 1: the model training unit of the cloud model training server performs the model training according to the whole-flow actual aluminum oxide production index data generated during the aluminum oxide actual operation, acquired by the data acquisition device within the certain time, and the selected aluminum oxide production index forecasting algorithm, and transmits the model training result to the model training and evaluating unit; the model training process comprises the following processes:

The data selection: performing interval partitioning on the whole-flow actual aluminum oxide production index data acquired by the data acquisition device according to a training purpose;

The data partitioning: partitioning the selected whole-flow actual aluminum oxide production index data into a training set and a test set by selecting a data partitioning method;

The data pre-processing: selecting different data pre-processing algorithms according to different targets and data forms; and The algorithm selection: selecting the aluminum oxide production index algorithm to be subjected to the model training process from the algorithm and model library management unit;

Step 2: the model training and evaluating unit performs the property evaluation on the aluminum oxide production index forecasting model trained by the model training unit, property evaluation indexes comprise the mean square errors, the average absolute value errors, the average absolute percentage errors and the forecasting value and actual value correlation coefficients;

The model parameter correction process comprises the following steps:

Step C1: the big data analysis unit calculates the correlation coefficients between the aluminum oxide production index forecasting result and the actual value through the trained aluminum oxide production index forecasting model according to the acquired aluminum oxide production and operation data, and determines whether the model parameter correction needs to be performed according to the correlation coefficients, if the correlation coefficients between the aluminum oxide production index forecasting result and the actual value are smaller than a correlation coefficient threshold set according to specific production index requirements, step 2 is executed for the model parameter correction, or else the model parameter correction is not performed;

Step C2: the forecasting model parameter correction unit is configured to perform training forecasting model on the basis of the forecasting model parameters set by the model training unit according to a big data analysis result obtained by the big data analysis unit, so as to obtain the corrected forecasting model parameters adapting to the big data analysis result; and Step C3: the forecasting model analysis unit forecasts and analyzes the whole-flow actual aluminum oxide production index data stored in the forecasting model training scheme management unit through the corrected forecasting model parameters and the current forecasting model parameters; if the aluminum oxide production index result forecasted with the corrected forecasting model parameters is better in accuracy than that with the current forecasting model parameters, the corrected forecasting model parameters are selected, or else the current forecasting model parameters are maintained not to be changed;

The operating the aluminum oxide product index forecasting computer at the edge end comprises the following steps:

Step S1: the model selection module selects the aluminum oxide production index forecasting model to be forecasted according to the aluminum oxide production process;

Step S2: the model parameter correction module imports the forecasting model parameters corrected at the cloud model training server through the model correction parameter download unit, or directly and remotely updates the corrected forecasting model parameters at the cloud; and Step S3: the intelligent forecasting unit forecasts the aluminum oxide production indexes for different production processes by the trained aluminum oxide production index forecasting model at the edge end.

By adopting the technical scheme, the following beneficial effects are generated: according to the cloud-edge collaboration forecasting system and method for aluminum oxide production indexes provided by the invention, based on the existing aluminum oxide whole-flow production requirements, selection of the aluminum oxide production index forecasting algorithm, and the parameter configuration, model training and evaluating and correcting processes of the training model are performed at the cloud model training server, and powerful computing resources are provided for training the aluminum oxide production index forecasting model; and the model trained at the cloud is used for forecasting the aluminum oxide production indexes in real time at the edge end, so that edge end resources are saved, and the forecasting result of the aluminum oxide production indexes is convenient to check in time.

DETAILED DESCRIPTION OF THE PREFERRED EMBODIMENT

The specific implementations of the invention are described in more detail below with reference to the accompanying drawings and embodiments. The following examples are intended to illustrate the invention, rather than to limit the scope of the invention.

Figure 1:
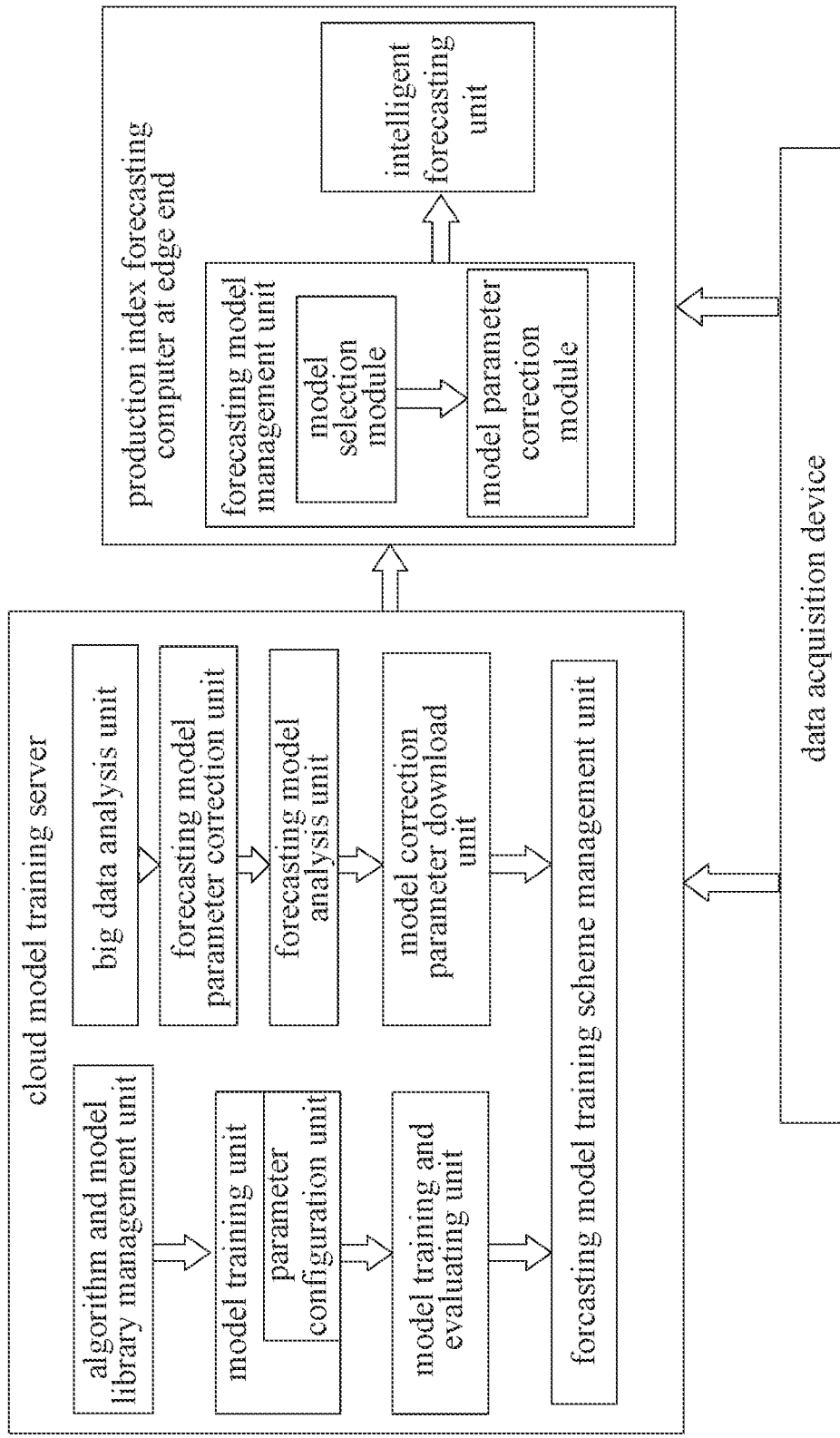
FIG. 1 is a structural block diagram of a cloud-edge collaboration forecasting system for aluminum oxide production indexes according to an embodiment of the invention.

In the embodiment, as shown in FIG. 1, the cloud-edge collaboration forecasting system for aluminum oxide production indexes comprises a data acquisition device, a hardware platform and a software system arranged on the hardware platform, wherein the data acquisition device is used for acquiring whole-flow actual data in the aluminum oxide production process and transmitting the acquired data in a fixed time interval to a cloud server and an aluminum oxide production index forecasting computer at an edge end; the hardware platform comprises a cloud model training server and an aluminum oxide production index forecasting computer at the edge end; the software system comprises software arranged in the cloud model training server and software arranged in the aluminum oxide production index forecasting computer at the edge end; and the software arranged in the cloud model training server realizes selective management of an aluminum oxide production index forecasting algorithm, trains and evaluates an aluminum oxide production index forecasting model through the whole-flow actual data in the aluminum oxide production process, acquired by the data acquisition device, applies the acquired data to the production index forecasting model, performs big data analysis on a model forecasting result and the actual production index data, and further corrects forecasting model parameters; and the software arranged in the aluminum oxide production index forecasting computer at the edge end can import forecasting model parameters after being corrected by a cloud model training server from the cloud model training server, or directly and remotely update the corrected parameters, further transmit the whole-flow actual data in the aluminum oxide production process, acquired by the data acquisition device, into the edge end, and forecast the aluminum oxide production indexes for different production processes through a trained forecasting model at the edge end.

The software arranged in the cloud model training server comprises a forecasting model training scheme management unit, an algorithm and model library management unit, a big data analysis unit, a model training unit, a forecasting model parameter correction unit, a forecasting model analysis unit and a model correction parameter download unit;

The forecasting model training scheme management unit is used for managing training sample data and storage model parameters used during training a forecasting model, so as to perform comparison when analyzing the properties of the forecasting model;

The algorithm and model library management unit is used for managing the obtained aluminum oxide production index forecasting model, the forecasting algorithm adopted in the model training process, and commonly-used data processing algorithms built in a system, and provides creating, updating and deleting functions of the forecasting algorithm;

The model training unit is used for performing model training according to data generated during aluminum oxide actual operation, acquired by the data acquisition device within a certain time, and the selected forecasting algorithm, and transmitting the model training result to a model training and evaluating unit; the model training process comprises four steps of data selection, data partitioning, data preprocessing and algorithm selection; besides, the model training unit also comprises a parameter configuration unit used for performing forecasting algorithm parameter configuration on a specific training algorithm adopted in the model training process;

The big data analysis unit calculates correlation coefficients between the aluminum oxide production index forecasting result and an actual value through the trained model according to acquired aluminum oxide production and operation data, and judges whether model parameter correction needs to be performed according to the correlation coefficients;

The forecasting model parameter correction unit configures a subsequent training forecasting model on the basis of the model training parameters according to latest production working condition data so as to obtain corrected forecasting model parameters adapting to new working conditions;

The forecasting model analysis unit forecasts and analyzes the aluminum oxide production index data stored in a forecasting model training scheme management unit through the corrected forecasting model parameters and the current forecasting model parameters; if the aluminum oxide production index result forecast with the corrected model parameters is better in accuracy than that with the forecasting model of current parameters, the corrected forecasting model parameters are selected, or else the current forecasting model parameters are maintained not to be changed; and The model correction parameter download unit provides an output function of the corrected forecasting model parameters, so that the corrected forecasting model parameters are downloaded in the forecasting model management unit of the aluminum oxide production index forecasting computer at the edge end, and besides, further provides an on-line download interface of the corrected model parameters which are automatically and remotely updated by the software in the aluminum oxide production index forecasting computer at the edge end.

The cloud model training server further comprises the model training and evaluating unit used for performing property evaluation on the trained forecasting model, wherein as for the property evaluation, comparison analysis is performed through indexes of mean square errors, average absolute value errors, average absolute percentage errors and forecasting value and actual value correlation coefficients.

The software arranged in the aluminum oxide production index forecasting computer at the edge end comprises a forecasting model management unit and an intelligent forecasting unit;

The forecasting model management unit manages the training scheme of a local edge end model, and comprises a model selection module and a model parameter correction module, wherein the model selection module selects an aluminum oxide production index forecasting model of the corresponding production process for forecasting according to the judgement result of the aluminum oxide production process, and the edge end and the cloud both have the same various aluminum oxide production index forecasting model training schemes; the model parameter correction module imports the forecasting model parameters corrected by the cloud model training server, or directly and remotely updates the correction parameters so as to still guarantee the accuracy of the model forecasting result under new working conditions; and The intelligent forecasting unit forecasts aluminum oxide production indexes for different production processes with whole-flow actual data of aluminum oxide production, transmitted in the edge end by the trained forecasting model at the edge end.

Figure 2:
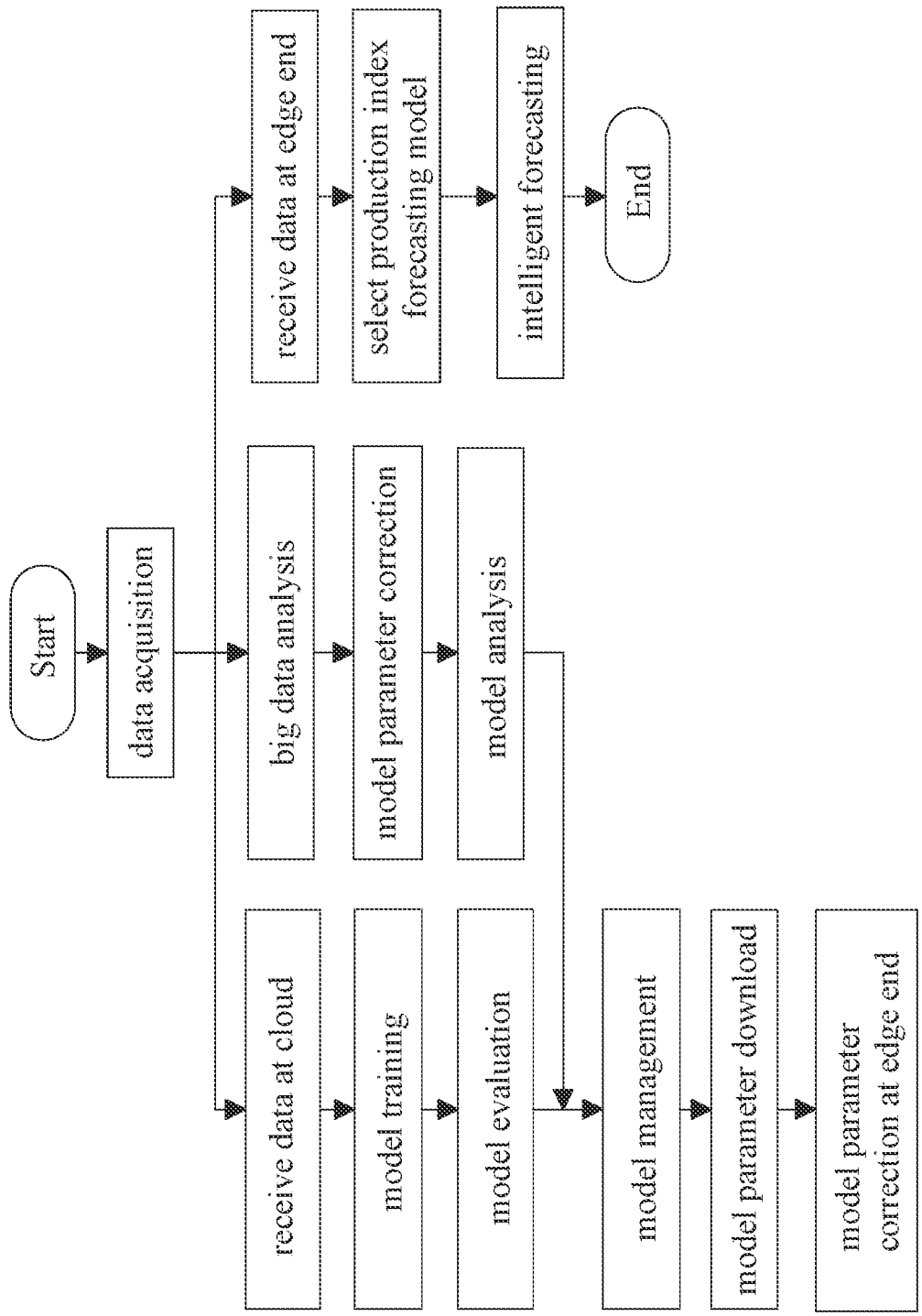
FIG. 2 is a flowchart of a cloud-edge collaboration forecasting method for aluminum oxide production indexes according to an embodiment of the invention.

As shown in FIG. 2, the cloud-edge collaboration forecasting method for aluminum oxide production indexes comprises three parts of acquiring aluminum oxide production index data, operating the cloud training server and operating the aluminum oxide production index forecasting computer at the edge end, wherein The acquiring the aluminum oxide production index data means acquiring actual operation data generated during aluminum oxide production by the data acquisition device, and transmitting the acquired data to the forecasting model training scheme management unit of the cloud training server and the data pre-processing unit of the aluminum oxide production index forecasting computer at the edge end;

The operating the cloud training server comprises a model training process and a model parameter correction process, wherein The model training process comprises the following steps:

Step 1: the model training unit of the cloud training server performs model training according to data generated during aluminum oxide actual operation, acquired by the data acquisition device within a certain time, and the selected forecasting algorithm, and transmits the model training result to a model training and evaluating unit; the model training process comprises the following processes:

Data selection: performing interval partitioning on the aluminum oxide production whole-flow data acquired by the data acquisition device according to a training purpose;

In the embodiment, 500 pieces of sample data in an aluminum oxide dissolution process in a certain time period is selected for model training, the selected forecasting production index is dissolution rate, and the selected data is shown as Table 1:

TABLE 1

500 pieces of operation sample data in the aluminum oxide dissolution process in a certain time period

| Serial No. | Sample data |
|---|---|
| 1 | 3.984314, 4.4, 322, 357, 0.327, 2.542941, 803, . . . , 7481.451529, 1681.090452, 21.7, 19.9, 2762.857691, 0.875 |
| 2 | 4.317111, 10.2, 333, 253, 0.015, 2.522122, 954, . . . , 889 1.41272, 2181.135371, 20.8, 18.32, 2302.865145, 0.784 |
| 3 | 4.884135, 10.7, 323, 317, 0.242, 2.522122, 954, . . . , 8891.379545, 2301.061061, 21.2, 19.98, 2372.888571, 0.762 |
| 4 | 4.459016, 10.7, 386, 287, 0.411, 2.522122, 954, . . . , 8891.398573, 2441.115933, 18, 16.13, 2492.9, 1.21 |
| 5 | 4.728682, 4.5, 414, 334, 0.011, 2.53603, 909, . . . , 9661.381733, 1841.144191, 19.6, 17.13, 2402.882614, 1.267 |
| 6 | 4.829991, 9.5, 319, 329, 0.115, 2.53603, 909, . . . , 9661.39877, 2141.104083, 19.2, 17.39, 3362.920118, 0.893 |
| 7 | 4.471074, 9.8, 348, 280, 0.034, 2.53603, 909, . . . , 9661.392813, 2341.091925, 21.5, 19.69, 2092.867864, 1.321 |
| 8 | 5.097132, 8.1, 336, 309, 0.274, 2.762571, 937, . . . , 8941.385423, 2401.06701, 20.7, 19.4, 2393.220661, 0.911 |
| 9 | 4.800725, 10.8, 310, 286, 1.139, 2.444321, 834, . . . , 9011.4010441981.127901, 20.9, 18.53, 2282.947068, 1.189 |
| 10 | 4.707379, 9.8, 387, 326, 0.115, 2.444321, 834, . . . , 9011.406646 2371.082251, 20, 18.48, 2592.941878, 1.122 |
| . . . | 6.325167, 6.8, 352, 268, 0.206, 2.50048, 711, . . . , 7601.359253 1991.112782, 22.2, 19.95, 2352.901837, 1.273 |

TABLE 1-continued

500 pieces of operation sample data in the aluminum oxide dissolution process in a certain time period

| Serial No. | Sample data |
|---|---|
| 496 | 5.048716, 5.8, 318, 307, 0.192, 2.457165, 649, . . . , 5091.381772 1991.038839, 22.2, 21.37, 4142.948894, 0.614 |
| 497 | 4.877498, 6.5, 365, 311, 0.074, 2.613749, 778, . . . , 6951.364773 2231.082423, 21.8, 20.14, 2603.004254, 0.386 |
| 498 | 5.045372, 3.9, 392, 266, 0.189, 2.613749, 778, . . . , 6951.357524 2641.104199, 21.3, 19.29, 2782.925957, 1.077 |
| 499 | 6.107724, 7.4, 330, 320, 0.156, 2.745085, 750, . . . , 5871.354931, 2431.22393, 22.3, 18.22, 4082.972786, 0.22 |
| 500 | 4.629475, 7.6, 348, 336, 0.143, 2.745085, 750, . . . , 5871.352686 2411.172775, 22.4, 19.1, 319 3.00776, 0.218 |

Data partitioning: partitioning the selected data into a training set and a test set by selecting a data partitioning method;

In the embodiment, 80% of the data is selected as the training set, 20% of the data is selected as the test set, and a random partitioning manner is selected;

Data pre-processing: selecting different data pre-processing algorithms according to different targets and data forms; and In the embodiment, a standard algorithm is selected for data pre-processing, and the data pre-processing algorithm can perform operations of creating, updating and the like voluntarily in the algorithm management module;

Algorithm selection: selecting the algorithm to be subjected to model training from the algorithm and model library management unit;

In the embodiment, an $\varepsilon$ support vector machine algorithm is selected for model training, parameters needing to be configured in the algorithm respectively comprise penalty factors C, error precision requirements c and a kernel function, the kernel function in the embodiment selects an RBF function, and parameters C and $\varepsilon$ are respectively C=52, and $\varepsilon$=1.9;

Step 2: the model training and evaluating unit performs property evaluation on the forecasting model trained by the model training unit, property evaluation indexes comprise mean square errors, average absolute value errors, average absolute percentage errors and forecasting value and actual value correlation coefficients;

In the embodiment, the mean absolute errors are selected to evaluate the properties of the model, the mean absolute error value is 0.2 and is smaller than the set threshold 0.5, which indicates that the training effects of the model are good, and the model can be used as a dissolution rate forecasting model to be stored in the forecasting model training scheme management unit;

The model parameter correction process comprises the following steps:

Step C1: the big data analysis unit calculates correlation coefficients between the aluminum oxide production index forecasting result and an actual value through the trained model according to the new acquired aluminum oxide production and operation data, and judges whether model parameter correction needs to be performed according to the correlation coefficients, if the correlation coefficients between the aluminum oxide production index forecasting result and the actual value are smaller than the correlation coefficient threshold set according to specific production index requirements, step 2 is executed for model parameter correction, or else model parameter correction is not performed;

Step C2: the forecasting model parameter correction unit configures a subsequent training forecasting model on the basis of the forecasting model parameters set by the model training unit according to the big data analysis result obtained by the big data analysis unit, so as to obtain the corrected forecasting model parameters adapting to big data analysis result; and Step C3: the forecasting model analysis unit forecasts and analyzes the aluminum oxide production index data stored in the forecasting model training scheme management unit through the corrected forecasting model parameters and the current forecasting model parameters; if the aluminum oxide production index result forecast with the corrected model parameters is better in accuracy than that with the forecasting model of current parameters, the corrected forecasting model parameters are selected, or else the current forecasting model parameters are maintained not to be changed;

The operating the aluminum oxide product index forecasting computer at the edge end comprises the following steps:

Step S1: the model selection module selects the aluminum oxide production index forecasting model to be forecasted according to the aluminum oxide production process;

Step S2: the model parameter correction module imports the forecasting model parameters corrected at the cloud model training server through the model correction parameter download unit, or directly and remotely updates the corrected parameters at the cloud; and Step S3: the intelligent forecasting unit forecasts aluminum oxide production indexes for different production processes by the trained forecasting model at the edge end.

In the embodiment, 4 groups of forecasting models trained at the cloud are given to intelligently forecast the dissolution rate of the production indexes at the edge end, and the obtained forecasting result is as shown in Table 2:

TABLE 2

Intelligent forecasting result of dissolution rate of production indexes

| Serial No. | Data input by intelligent forecasting unit | Actual value of dissolution rate | Forecasting value of dissolution rate | deviation |
|---|---|---|---|---|
| 1 | 5.190909, 9.2, 340, 290, 0.212, 2.529651, 833, . . . , 6981.400877, 204 1.08867, 22.1, 20.3, 2262.776577, 0.876 | 97.2 | 97.18 | −0.02 |
| 2 | 5.404624, 6.4, 344, 341, 0.123, 2.621695, 768, . . . , 6861.372769 1811.132686, 21, 18.54, 2322.828949, 1.768 | 95.8 | 95.74 | −0.06 |
| 3 | 5.71134, 6.7, 365, 249, 0.105, 2.621695, 768, . . . , 6861.420589 1741.085884, 22, 20.26, 245 2.95857, 0.877 | 96.2 | 96.3 | 0.1 |
| 4 | 4.546926, 12.1, 325, 219, 0.105, 2.566212, 869, . . . , 8721.411038, 1921.131222, 22.5, 19.89, 2142.839053, 0.792 | 98.5 | 98.43 | −0.07 |

Finally, it should be noted that the embodiments are merely intended to describe the technical schemes of the invention, rather than to limit the invention. Although the invention is described in detail with reference to the above embodiments, persons of ordinary skilled in the art should understand that they may still make modifications to the technical schemes described in the above embodiments or make equivalent replacements to some or all technical features thereof. However, these modifications or replacements do not cause the essence of the corresponding technical schemes to depart from the scope of the technical schemes of the embodiments of the invention.

What is claimed is:

1. A cloud-edge collaboration forecasting system for aluminum oxide production indexes, comprising a sensor, a hardware platform and a software system arranged on the hardware platform, wherein the sensor is used for acquiring whole-flow actual aluminum oxide production index data in an aluminum oxide production process; the hardware platform comprises a cloud model training server and the aluminum oxide production index forecasting computer at an edge end; the software system comprises software arranged in the cloud model training server and software arranged in the aluminum oxide production index forecasting computer at the edge end; and the software arranged in the cloud model training server realizes selective management of an aluminum oxide production index forecasting algorithm, trains and evaluates an aluminum oxide production index forecasting model through the whole-flow actual aluminum oxide production index data in the aluminum oxide production process, applies the acquired whole-flow actual aluminum oxide production index data to the aluminum oxide production index forecasting model, performs big data analysis on a model forecasting result and the whole-flow actual aluminum oxide production index data, and further corrects forecasting model parameters; the software arranged in the aluminum oxide production index forecasting computer at the edge end imports the forecasting model parameters after being corrected by the cloud model training server from the cloud model training server, or directly and remotely updates the corrected forecasting model parameters, further transmits the whole-flow actual aluminum oxide production index data in the aluminum oxide production process, acquired by the sensor, into the edge end, and forecasts the aluminum oxide production indexes for different production processes through the trained aluminum oxide production index forecasting model at the edge end, wherein the software arranged in the cloud model training server comprises a forecasting model training scheme management unit, an algorithm and model library management unit, a big data analysis unit, a model training unit, a forecasting model parameter correction unit, a forecasting model analysis unit and a model correction parameter download unit;

wherein the forecasting model training scheme management unit is used for managing training sample data and storage model parameters used during a period of training the aluminum oxide production index forecasting model, so as to perform comparison when analyzing properties of the aluminum oxide production index forecasting model;

wherein the algorithm and model library management unit is used for managing the obtained aluminum oxide production index forecasting model, the aluminum oxide production index forecasting algorithm adopted in a model training process, and data processing algorithms built in the software system, and provides creating, updating and deleting functions of the aluminum oxide production index forecasting algorithm;

wherein the model training unit is used for performing model training according to the whole-flow actual aluminum oxide production index data generated during aluminum oxide actual operation, acquired by the sensor within a certain time, and a selected aluminum oxide production index forecasting algorithm, and transmitting a model training result to a model training and evaluating unit the model training process comprises four steps of data selection, data partitioning, data pre-processing and algorithm selection;

wherein the big data analysis unit calculates correlation coefficients between an aluminum oxide production index forecasting result and an actual value through the trained aluminum oxide production index forecasting model according to acquired aluminum oxide production and operation data, and determines whether model parameter correction needs to be performed according to the correlation coefficients;

wherein the forecasting model parameter correction unit is configured to perform training the aluminum oxide production index forecasting model on the basis of model training parameters according to latest production working condition data so as to obtain the corrected forecasting model parameters adapting to new working conditions; wherein the forecasting model analysis unit forecasts and analyzes the whole-flow actual aluminum oxide production index data stored in a forecasting model training scheme management unit through the corrected forecasting model parameters and current forecasting model parameters; if an aluminum oxide production index result forecasted with the corrected forecasting model parameters is better in accuracy than that with the current forecasting model parameters, the corrected forecasting model parameters are selected, or else the current forecasting model parameters are maintained not to be changed; and wherein the model correction parameter download unit provides an output function of the corrected forecasting model parameters, so that the corrected forecasting model parameters are downloaded in a forecasting model management unit of the aluminum oxide production index forecasting computer at the edge end, and further provides an on-line download interface of the corrected forecasting model parameters which are automatically and remotely updated by the software in the aluminum oxide production index forecasting computer at the edge end.

2. The cloud-edge collaboration forecasting system according to claim 1, wherein the cloud model training server further comprises the model training and evaluating unit used for performing property evaluation on the trained aluminum oxide production index forecasting model, wherein as for the property evaluation, comparison analysis is performed through indexes of mean square errors, average absolute value errors, average absolute percentage errors and forecasting value and actual value correlation coefficients.

3. The cloud-edge collaboration forecasting system according to claim 2, wherein the model training unit is further internally provided with a parameter configuration unit used for performing parameter configuration of the aluminum oxide production index forecasting algorithm on a specific training algorithm adopted in the model training process.

4. The cloud-edge collaboration forecasting system according to claim 3, wherein the software arranged in the aluminum oxide production index forecasting computer at the edge end comprises the forecasting model management unit and an intelligent forecasting unit;

wherein the forecasting model management unit manages a training scheme of a local edge end model, and comprises a model selection module and a model parameter correction module, wherein the model selection module selects the aluminum oxide production index forecasting model of a corresponding production process for forecasting according to a determination result of the aluminum oxide production process, and the edge end and a cloud both have the same various aluminum oxide production index forecasting model training schemes; the model parameter correction module imports the forecasting model parameters corrected by the cloud model training server, or directly and remotely updates the corrected forecasting model parameters so as to still guarantee an accuracy of the model forecasting result under the new working conditions; and wherein the intelligent forecasting unit forecasts the aluminum oxide production indexes for different production processes with the whole-flow actual aluminum oxide production index data, transmitted to the edge end by the trained aluminum oxide production index forecasting model at the edge end.

5. A cloud-edge collaboration forecasting method for aluminum oxide production indexes by using the cloud-edge collaboration forecasting system according to claim 4, comprising three parts of acquiring the whole-flow actual aluminum oxide production index data, operating the cloud model training server and operating the aluminum oxide production index forecasting computer at the edge end, wherein the acquiring the whole-flow actual aluminum oxide production index data means acquiring actual operation data generated in the aluminum oxide production process by the sensor, and transmitting the acquired actual operation data to the model training unit of the cloud model training server and the intelligent forecasting unit of the aluminum oxide production index forecasting computer at the edge end; wherein the operating the cloud model training server comprises the model training process and a model parameter correction process, wherein the model training process comprises following steps:

step 1: the model training unit of the cloud model training server performs the model training according to the whole-flow actual aluminum oxide production index data generated during the aluminum oxide actual operation, acquired by the sensor within the certain time, and the selected aluminum oxide production index forecasting algorithm, and transmits the model training result to the model training and evaluating unit;

step 2: the model training and evaluating unit performs the property evaluation on the aluminum oxide production index forecasting model trained by the model training unit, property evaluation indexes comprise the mean square errors, the average absolute value errors, the average absolute percentage errors and the forecasting value and actual value correlation coefficients;

wherein the model parameter correction process comprises the following steps:

step C1: the big data analysis unit calculates the correlation coefficients between the aluminum oxide production index forecasting result and the actual value through the trained aluminum oxide production index forecasting model according to the acquired aluminum oxide production and operation data, and determines whether the model parameter correction needs to be performed according to the correlation coefficients, if the correlation coefficients between the aluminum oxide production index forecasting result and the actual value are smaller than a correlation coefficient threshold set according to specific production index requirements, step 2 is executed for the model parameter correction, or else the model parameter correction is not performed;

step C2: the forecasting model parameter correction unit is configured to perform training forecasting model on the basis of the forecasting model parameters set by the model training unit according to a big data analysis result obtained by the big data analysis unit, so as to obtain the corrected forecasting model parameters adapting to the big data analysis result; and step C3: the forecasting model analysis unit forecasts and analyzes the whole-flow actual aluminum oxide production index data stored in the forecasting model training scheme management unit through the corrected forecasting model parameters and the current forecasting model parameters; if the aluminum oxide production index result forecasted with the corrected forecasting model parameters is better in accuracy than that with the current forecasting model parameters, the corrected forecasting model parameters are selected, or else the current forecasting model parameters are maintained not to be changed;

wherein the operating the aluminum oxide product index forecasting computer at the edge end comprises the following steps:

step S1: the model selection module selects the aluminum oxide production index forecasting model to be forecasted according to the aluminum oxide production process;

step S2: the model parameter correction module imports the forecasting model parameters corrected at the cloud model training server through the model correction parameter download unit, or directly and remotely updates the corrected forecasting model parameters at the cloud; and step S3: the intelligent forecasting unit forecasts the aluminum oxide production indexes for different production processes by the trained aluminum oxide production index forecasting model at the edge end.

6. The cloud-edge collaboration forecasting method according to claim 5, wherein the model training process comprises following processes:

the data selection: performing interval partitioning on the whole-flow actual aluminum oxide production index data acquired by the sensor according to a training purpose;

the data partitioning: partitioning the selected whole-flow actual aluminum oxide production index data into a training set and a test set by selecting a data partitioning method;

the data pre-processing: selecting different data pre-processing algorithms according to different targets and data forms; and the algorithm selection: selecting the aluminum oxide production index algorithm to be subjected to the model training process from the algorithm and model library management unit.

* * * * *